United States Patent [19]
Fewox

[11] Patent Number: 4,696,259
[45] Date of Patent: Sep. 29, 1987

[54] ENCLOSURE AND HOUSING FACILITY FOR AN ANIMAL

[75] Inventor: Cary M. Fewox, Mulberry, Fla.

[73] Assignee: C&M Custom and Portable Kennels, Inc., Mulberry, Fla.

[21] Appl. No.: 800,249

[22] Filed: Nov. 21, 1985

[51] Int. Cl.$^4$ ............................................. A01K 1/02
[52] U.S. Cl. ........................................ 119/19; 119/20
[58] Field of Search ................. 119/17, 18, 19, 20, 119/16, 27

[56] References Cited
U.S. PATENT DOCUMENTS

| | | | |
|---|---|---|---|
| 3,292,582 | 12/1966 | Rubricius | 119/17 |
| 3,731,657 | 5/1973 | Alessio | 119/17 |

*Primary Examiner*—Hugh R. Chamblee
*Attorney, Agent, or Firm*—John Cyril Malloy

[57] ABSTRACT

An enclosure and housing assembly for an animal such as a dog, cat or like animal, sufficiently structured to be positioned at a given site to provide containment of the animal while at the same time providing housing facilities and protection from the elements. The assembly includes a lightweight material base such as rigid fiberglass molded into an integral, one-piece construction and an enclosure and cover secured thereto and extending upwardly therefrom in surrounding relation to the base. A housing is mounted on the enclosure above the base and provides an enclosed shelter for the animal accessible from the interior of the closure means wherein the enclosure is dimensioned and configured for exercising of the animal in a safe and secure area and the housing structured for the sleep or rest of the animal in a dry, sanitary environment.

13 Claims, 15 Drawing Figures

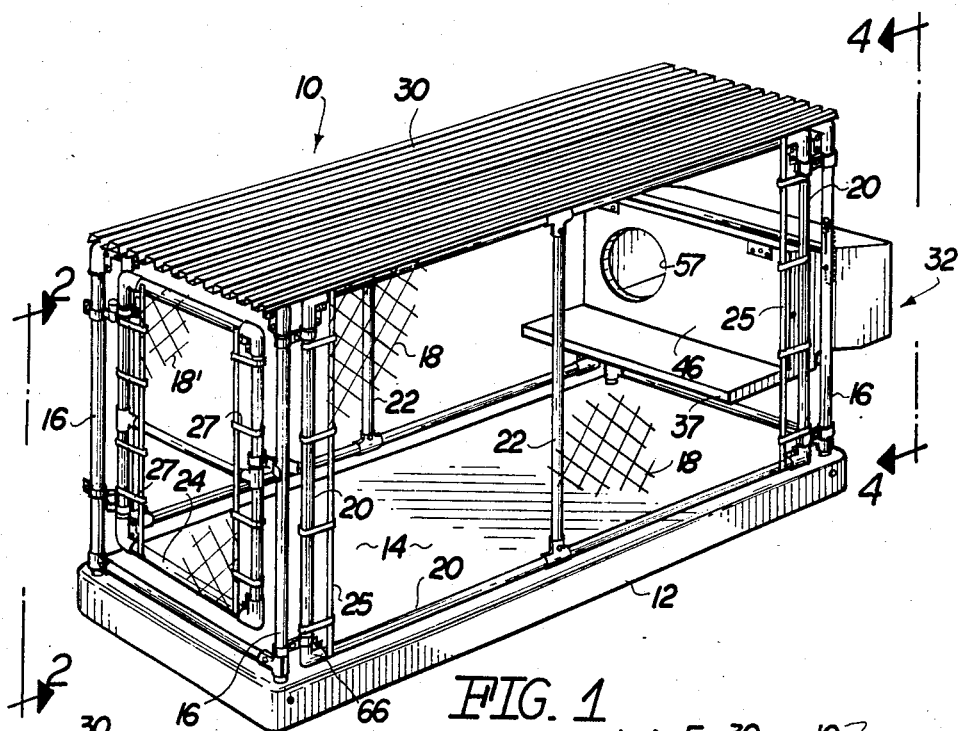
FIG. 1
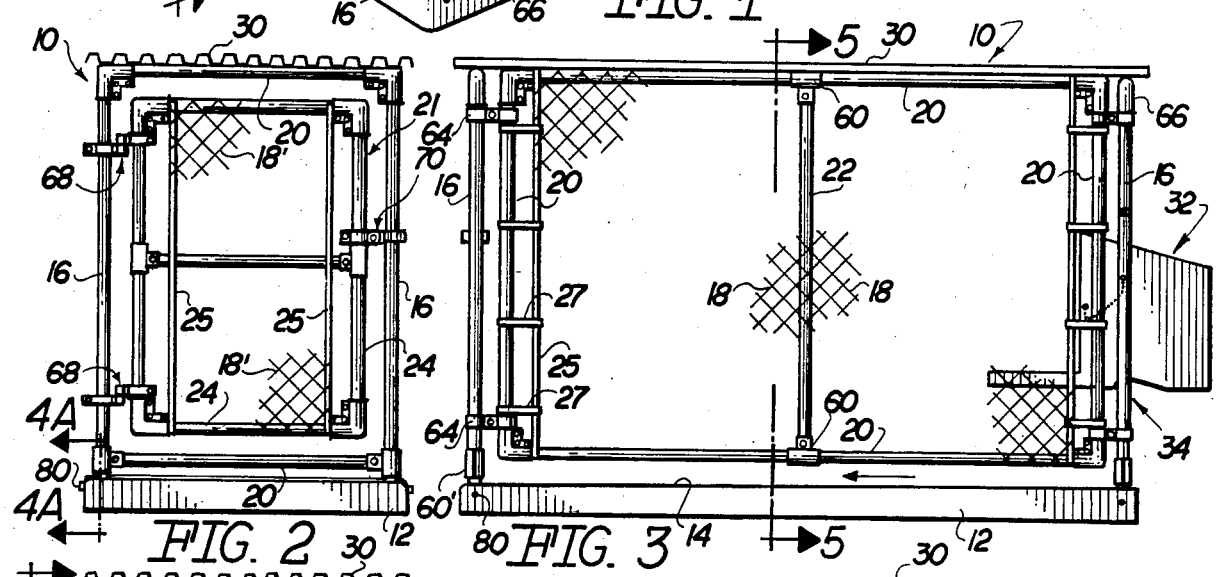
FIG. 2  FIG. 3
FIG. 4  FIG. 4A  FIG. 5

ENCLOSURE AND HOUSING FACILITY FOR AN ANIMAL

BACKGROUND OF THE INVENTION

1. Field of the Invention

This invention relates to a housing and enclosure facility for animals, of varying size and most commonly domestic animals such as dogs, cats, but also larger animals including wolves, cougars, etc., which is structured to be positioned in a stable manner at a given site for containment of such animals. The facility is portable to the extent of being movable from site to site without structural modification or excessive anchoring facilities being required.

2. Description of the Prior Art

Structures relating to kennels or similar housing facilities for animals have of course been well known for many years. Typically, the larger containment kennels are also capable of providing the animal with some exercise area while at the same time adding more protective shelter in the form of a smaller enclosure disposed within the larger containment area. One disadvantage associated with the majority of prior art devices is the permanency of construction when installing or positioning such kennels. Such typical or prior art methods of installation make it difficult or impossible to move the kennel structure, as a unit, from site to site.

The numerous prior art structures referred to above are generally represented in the structures of the U.S. patents to Wright, U.S. Pat. No. 3,951,106; Reich, U.S. Pat. No. 4,347,807; Petrucciani, U.S. Pat. No. 3,962,994; Giles, U.S. Pat. No. 2,932,279; Marnett, U.S. Pat. No. 3,791,348; and Parker, U.S. Pat. No. 3,256,860.

While the structures disclosed in the above-noted patents are assumed to be operable for their intended function, these prior art structures generally include the same disadvantages associated with known structures as delineated above. Accordingly, it should be apparent that there is a need in the prior art for a kennel structure which is essentially portable in nature in that it is not permanently installed and that such a preferred assembly includes an elevated pet shelter permanently maintained in spaced relation above the floor of the assembly so that the pet may be maintained in a sanitized environment rather than being forced to lie on the surface of the base of the assembly where waste products of the animal are necessarily left. Further, such a preferred assembly should include a substantially molded, one-piece base formed of fiberglass rather than conventional cement or cementitious mixture bases. Such fiberglass material bases resist the breeding of insects including tics, fleas, roaches and like parasites as well as being less damaging to the pet. It is of course recognized that fiberglass is less irritating to the animal's elbow pads than a cement surface.

SUMMARY OF THE INVENTION

The present invention relates to an enclosure and housing facility for animals of all sizes including both domestic animals as well as others. The subject assembly includes a base preferably made from a lightweight yet rigid material such as fiberglass formed into an integral one-piece construction. Fiberglass is preferred both because it is generally lighter in weight than conventional cement slabs used as a permanent base in kennel structures. In addition, fiberglass material has been found to be less irritating to the contained animals especially in areas which come into frequent contact with the surface of the base such as at the elbow pads of the animal. An enclosure means preferably in the form of an open mesh or chain-link fence and supporting frame structure is secured to the base in surrounding relation to an exposed support surface on which the enclosed animal is supported. A cover or roof structure is secured to an upper portion of the enclosure means and is of a solid as versus an open mesh construction to provide at least minimal shelter from direct rays of the sun and rain, hail, snow, or like natural elements.

The subject assembly further includes a housing secured to one side of a multi-sided wall portion which at least partially defines the enclosure means. The housing is dimensioned and structured to almost totally enclose the animal once the animal enters and assumes a rest position. The housing includes an entrance accessible from the interior of the closure means so that the animal can exercise, rest, or travel within the relatively larger enclosure means while being supported on the base thereof. Further, the entrance is specifically structured to be maintained in an open position such that air can freely circulate throughout the interior of the housing in order to provide proper ventilation and cooling for the animal when in the housing. Alternately, the animal may enter the housing for sleep, rest or more protective shelter such as during harsh weather conditions and the entrance can remain closed. The housing includes an outwardly extending support platform of sufficient structural integrity to support the entire animal's weight thereon. Further, the entire housing, including the support platform, is mounted in a raised position above the support surface of the base but of course lower than the cover. Accordingly, the raised location of the support platform and housing above the surface of the base provides for the ability of the animal to rest or sleep in such a raised location out of contact with any waste material left on the surface of the base thereby providing a more sanitary environment in which the animal may rest or sleep. The distance of the housing above the support surface of the base is dependent upon the size of the animal but should be such as to allow easy access of the animal to the support platform and into the interior of the housing through the entrance means disposed in communicating relation with the interior of the enclosure means.

Other structural features of the subject enclosure include the floor of the interior of the housing being inclined or somewhat slanted towards the entrance thereof. Similarly, the support surface of the base is angularly oriented or somewhat slanted relative to the ground or like surface on which the entire assembly is mounted. The angular orientation of the housing floor and the support surface of the base is to facilitate free drainage of water therefrom when the housing and base respectively are being cleaned as by spraying vigorously with a lawn hose or like equipment. Therefore, any waste products, debris, food, etc. are quickly and easily removed from the areas occupied by the animal thereby rendering the subject assembly completely sanitary as long as cleaning is done on a regular basis. Also, as set forth above, the raised positioning of the support platform and housing allows the animal to be kept dry such as during water spraying of the base or cleaning thereof. The support surface is strong enough and large enough to allow comfortable positioning of the animal while the base dries after cleaning has taken place.

An important feature of the present invention is its substantially unitized construction to the extent that the various components including the base, enclosure means, cover, housing and the like are all interconnected to one another and ultimately supported on the base. The entire assembly can be moved, transported and positioned between a number of different sites, when such is required, without structural damage or modification to the assembly.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is an isometric view of the housing assembly of the present invention.

FIG. 2 is a front plan view of the embodiment of FIG. 1 along line 2—2 of FIG. 1.

FIG. 3 is a side plan view of the embodiment of FIG. 1 along line 3—3 of FIG. 4.

FIG. 4 is a rear end view along line 4—4 of FIG. 1.

FIG. 4A is a detailed view in partial cutaway in section showing attachment and support by the base to the rest of the housing assembly.

FIG. 5 is a sectional view along line 5—5 of FIG. 3.

Like reference numerals refer to like parts throughout the several views of the drawings.

DETAILED DESCRIPTION OF THE PREFERRED EMBODIMENT

Figure 8:
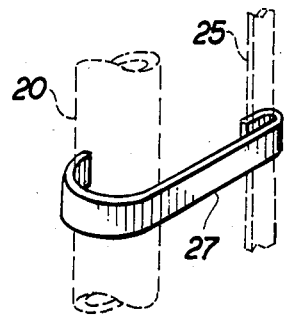
FIG. 8 is a detailed view of a connecting clamp associated with the enclosure of the present invention.

As shown in FIGS. 1 through 5, the housing and enclosure assembly of the present invention is generally indicated as 10 and includes a base 12 preferably formed of a lightweight yet strong and rigid material such as fiberglass of an integral, molded, one-piece construction. The base 12 is formed to include an exposed support surface 14 on which an animal is supported during rest or exercise. An enclosure means is secured to the base 12 by upstanding supporting stanchions 16 mounted or secured generally at the corners of the base. The closure means, as shown in FIGS. 1 through 4, is defined by a multi-sided wall portion collectively disposed in surrounding relation to the support surface 14 so as to define an enclosure interior in which an animal may be contained. In the embodiment shown in FIGS. 1 through 5, the enclosure means includes a plurality of open mesh "panels" 18 supported by a substantially surrounding frame 20 and cross braces 22. The open mesh panels 18 may be formed from a conventional chain-link fencing material while the upstanding stanchions 16, supporting frame 20, cross brace 22 and supporting door frame 24 are all preferably formed from a rigid, high-strength tubular material such as metal tubing or piping. Connecting strips 25 may be secured to end portions of the open mesh panels 18 and 18' and facilitate interconnection of these panels, by hook-type brackets 27 (see FIG. 8). It is of course within the scope of the present invention that the panels 18 may be made from other material and the supporting frame 20 and stanchion 16 may also have a varied construction. The open mesh configuration of panels 18 is provided to allow the maximum air and outdoor exposure to the animal contained therein while at the same time providing protection from harsh weather conditions.

The enclosure means further includes a cover supported on the frame members 20 extending across the upper end of each of the plurality of sides comprising the wall portion of the enclosure means. The cover or roof structure 30 is preferably made from a solid non-porous construction and may be corrugated as shown in FIGS. 1, 2, 4 and 5. The cover 30 is disposed in overlying relation to the support surface 14 of base 12 so as to provide at least minimal exposure to the direct rays of the sun as well as other harsh weather conditions such as rain, snow, hail, etc.

An important feature of the present invention is the inclusion of a housing generally indicated as 32 and secured to the assembly in supported relation by one endmost side 34 of the assembly 10. It should be obvious that the housing 32 could be mounted on any of the other sides of the wall portion with the exception of the door 21 mounted on and at least partially defining what may be referred to as a front and side of the multi-sided wall portion. As shown in FIGS. 1, 4, 6 and 7, the housing 32 may be formed of a substantially integral one-piece construction also having a multi-sided casing 35 and an outwardly extending support platform 37. The casing 35 is structured and configured to define a housing interior 36 in which an animal may position himself for rest or sleep. In such position, the animal is more completely enclosed and sheltered than when supported on the support surface 14 of the base 12 such as during exercise periods or the like. The casing 35 includes a top section 37, a rear section 38, and a floor section 40. As set forth above, the casing may be formed of an integral molded construction such as fiberglass so as to be lightweight yet have sufficient structural integrity to support an animal of substantial size. As set forth above, the utilization of fiberglass material in the various components of the subject invention rather than a cementitious material for the base or like material for the housing 32 has the advantage not only in its lightweight construction but also in the fact that fiberglass is less irritating to the animal particularly in the area of the animal's body which comes into contact with the surface such as when the animal is resting. According, elbow pads on dogs as well as other animals become less irritated which is important not only for the comfort of the animal but is of particular importance in the maintenance and sheltering of show animals. The undersurface generally indicated as 39 is specifically configured to include a cross channel 42 dimensioned to receive a support brace 44 connected to and being a part of the support frame 20 of the enclosure means defined by its multi-sided wall portion. The cross brace 44 is therefore considered to be a fixed part of the endmost side 34 (see FIG. 4) and an additional cross brace 44' is disposed in spaced apart, parallel relation to cross brace 44. The two parallel disposed cross braces further define an apertured construction in the endmost side 34 through which the housing 32 and specifically the casing 35 extend to an exterior oriented projection (see FIGS. 1 and 3).

Figure 6:
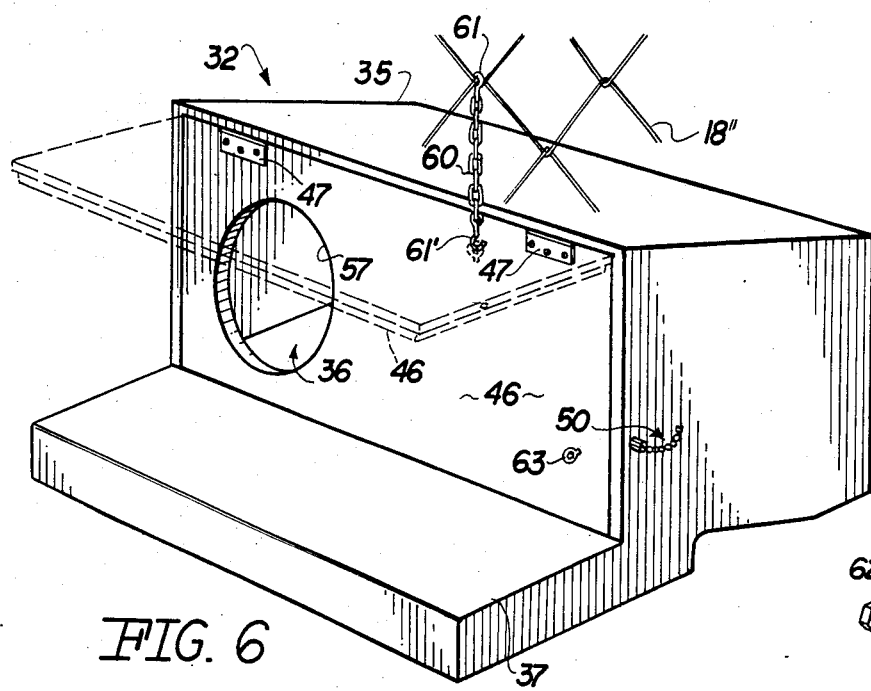
FIG. 6 is an isometric view in partial cutaway of a housing of the subject assembly wherein supporting structure and positions of a closure associated with the housing are shown in broken phantom lines.
Figure 7:
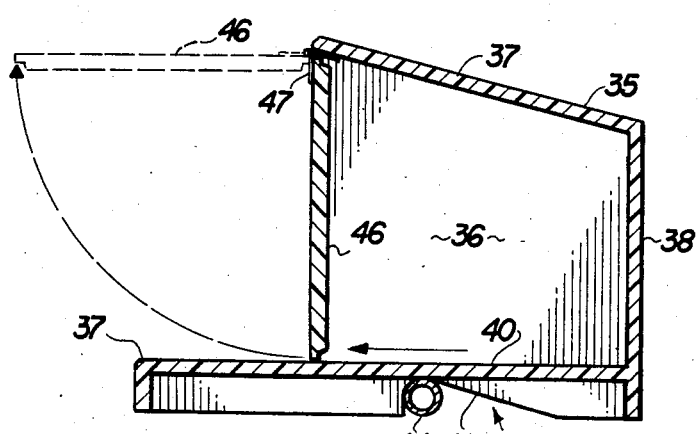
FIG. 7 is a sectional view showing the interior structural features of the embodiment of the housing as shown in FIG. 6.
Figure 10:
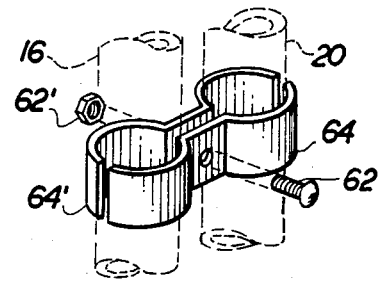
FIG. 10 is an isometric view of additional connecting hardware associated with the enclosure of the subject assembly.
Figure 11:
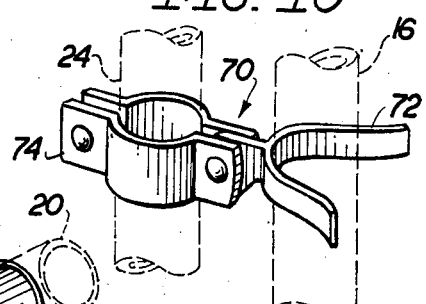
FIG. 11 is an isometric view of additional hardware associated with an opening and closing door of the enclosure of the subject assembly.
Figure 12:
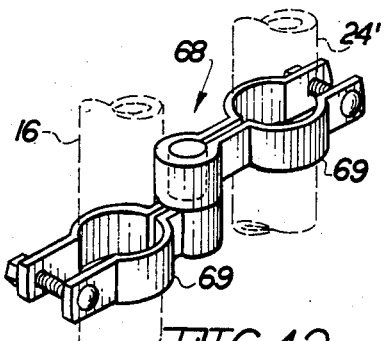
FIG. 12 is an isometric view of a hinge structure associated with the door of the subject assembly.
Figure 13:
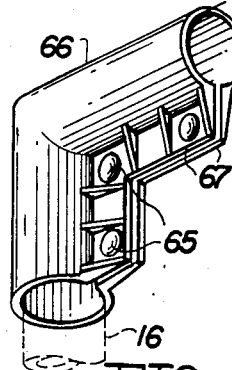
FIG. 13 is an isometric view of additional connecting hardware associated with the frame of the enclosure of the present invention.

The housing 32 further includes a movable closure 46 positionable by a hinge-type connector 47 between a covering and non-covering relation as represented in solid and phantom lines respectively relates to an open face or entrance to the interior 36 of the casing 35 as shown in FIGS. 6 and 7. The advantage of the closure 46 being maintained in its open position, as represented in phantom lines, is the ability to allow free circulation of air and cooling into the interior of the housing 32 in order to add to the comfort of the animal during summer days or the like. An elongated chain 60 having one end as at 61 secured to the chain link panel 18" and the other end 61' secured to a hook 63 allows removable maintenance of the closure 46 in its open position.

Figure 14:
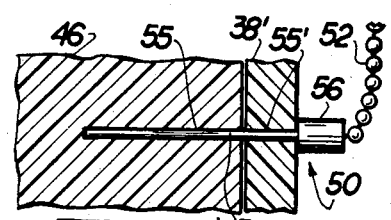
FIG. 14 is a detailed view in section of a locking facility associated with the closure of the housing.

A locking structure generally indicated as 50 (see FIGS. 6 and 14) includes a chain-type flexible connector 52 and an elongated pin 54 having a stop or expanded head portion 56. The elongated pin 54 passes through aligned apertures 55 and 55' formed in the side wall of the casing 38' and closure 46. In the position shown in 14 the closure is maintained in its closed or locked position to prevent inadvertent opening by the animal. When closed, access to the interior 36 may be provided by an apertured access means 57 integrally formed in the closure 46 as shown in FIGS. 1 and 6.

Figure 9:
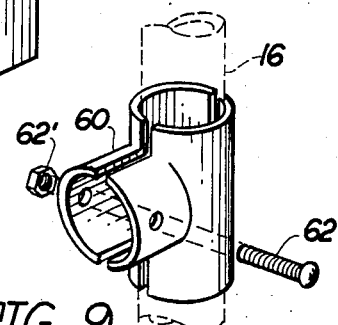
FIG. 9 is a detailed view of additional connecting hardware associated with the enclosure of the subject assembly.

With regard to FIGS. 9 through 13, numerous structural components or hardware are utilized in the subject assembly to interconnect and adequately support the open mesh panels 18 with support frame members 20 and ultimately supporting stanchions 16. FIG. 9 discloses a T-type connector designed to attach any type of cross bar or frame member to a transversely located stanchion 16. The T-connector 60 is secured to an interconnected member (not shown) by a threaded connector 62, 62' or other like connector. Similarly, parallel stanchion and frame members 16 and 20 respectively may be attached by connector element 64 again incorporating a substantially conventional connector element 62, 62' to clamp the correspondingly configured and dimensioned portions of the connector 64 as at 64' to one another and in gripping relation to the parallel members 16, 20.

With regard to FIG. 16, a corner brace and connector 66 has hollow receiving portions arranged at right angles to one another and reinforced by a depending and integrally secured flange pair 67 secured by connector 65 in the manner shown.

With regard to the door assembly 21 providing access into and out of the enclosure means either for a caretaker or animal, the door is hingedly secured by hinge elements 68 having opposite outwardly extending and pivotally interconnected portions 69 connected to opposite members as at 16 and 24'. Similarly, a latch member 70 includes a latching hook 72 gripping a stanchion 16 and a clamping portion 74 fixedly securing the latch 70 in place as to member 24 as clearly shown in FIG. 11.

Finally, with reference to FIG. 4A, a detailed view shows that mounting of the elongated support 16 into the base 12 occurs by the distal end of member 16 passing into a preformed or molded aperture to a certain depth and secured therein by an affixed connector 80 passing into the interior of the elongated member 16 through a portion of base 12 by inserting such connector 80 through a side wall as shown clearly in FIGS. 2, 3 and 4A. Accordingly, the insertion and anchoring of this connector 80 serves to prohibit removal of the member 16 from the aperture preformed in the base 12 as set forth above.

What is claimed is:

1. A housing assembly for an animal of the type primarily designed to enclose and provide shelter, said assembly comprising:
    (a) a base including an exposed support surface disposed and structured to support an animal thereon,
    (b) enclosure means mounted in substantially surrounding relation to said base for containment of the animal thereon, said enclosure means extending upwardly relative to said support surface,
    (c) said enclosure means including a wall portion configured to at least partially surround and define an enclosure interior, a cover connected to said wall portion and disposed in spaced, overlying relation to said support surface of said base and in substantially covering relation to an animal contained on said support surface,
    (d) a housing mounted on said enclosure means in spaced relation above said support surface and distanced therefrom sufficient to allow access thereto by the animal contained within said enclosure means,
    (e) said wall portion including an open mesh construction extending substantially from said support surface of said base upwardly to at least said housing and in surrounding relation to said enclosure interior,
    (f) said housing including an entrance positioned in accessible relation to said enclosure interior, said housing dimensioned and structured to house the animal within a housing interior of said housing in shielded, protected relation to harsh weather conditions,
    (g) said housing including a support platform disposed adjacent and beneath said entrance in substantially parallel relation to said support surface of said based, said support platform projecting outwardly from said entrance into said enclosure interior and being disposed and structured to support an animal theron, and said base made from a rigid, substantially lightweight material and said enclosure means and said housing interconnected in supported relation thereon, each of said enclosure means, base and housing collectively structured as a dependent unit and selectively movable to anyone of a variety of locations.

2. An assembly as in claim 1 wherein said housing comprises a floor disposed within said housing interior adjacent said entrance, said floor structured to facilitate drainage of liquid therefrom when said housing is being washed.

3. An assembly as in claim 2 wherein said floor is disposed and structured to slant towards an opening in said housing, said opening communicating directly with the exterior of said housing for drainage of liquid therefrom during washing.

4. An assembly as in claim 2 wherein said support surface of said base is structured to facilitate drainage of liquid therefrom during cleaning of said base.

5. An assembly as in claim 2 wherein said support surface is disposed in inclined orientation relative to a surface on which said base is positioned, said support surface and base collectively structured to draw excess liquid off a peripheral edge onto the surface of which said base is positioned.

6. An assembly as in claim 1 wherein said housing is supportingly mounted on said wall portion between said base and said cover and protruding outwardly from said enclosure interior in substantially transverse relation thereto, said entrance and said wall portion disposed in substantially adjacent relation to one another.

7. An assembly as in claim 1 wherein said support platform is integrally formed on said housing and dimensioned and disposed to facilitate access to an interior of said housing through said entrance.

8. An assembly as in claim 1 wherein said wall portion comprises a multi-sided configuration collectively disposed in surrounding relation to said base and extending upwardly from said support surface, one side of said wall portion including an apertured construction dimensioned and configured to receive said housing therein, said housing supported on said one side in accessible relation to an interior of said enclosure means.

9. An assembly as in claim 8 wherein said housing protrudes outwardly from said apertured structure of said one side wall and concurrently extends inwardly into an interior of said enclosure means, said entrance of said housing disposed to be clearly accessible from the interior of said closure means, the majority of said housing being supported by said side wall and being positioned exteriorly thereof.

10. An assembly as in claim 1 wherein said base is formed from a one-piece integrally constructed fiberglass module initially formed independently of the remainder of said housing assembly; said enclosure means secured directly to said base in surrounding relation to said supporting surface and said cover secured to an upper portion of said enclosure means in covering, overlying relation to said support surface and a frontal portion of said housing; said base, enclosure means, cover and housing interconnected as a single portable assembly, whereby the housing assembly is transportable between sites as a unit.

11. An assembly as in claim 1 wherein said housing further includes a closure movably mounted thereon adjacent said entrance and selectively positioned between a covering and a non-covering position relative to said entrance, access means formed on said closure and structured for access to an interior of said housing when said closure is in said covering position relative to said entrance.

12. An assembly as in claim 11 wherein said access means comprises an aperture integrally formed in said closure and being dimensioned to allow passage therethrough of the animal into said housing when said closure is in said covering position relative to said entrance of said housing.

13. An assembly as in claim 12 wherein said non-covering position is defined by said closure positioned out of covering relation to said entrance and maintenance of said closure in spaced substantially parallel relation to said support platform.

* * * * *